(12) United States Patent
Kim et al.

(10) Patent No.: US 9,046,712 B2
(45) Date of Patent: Jun. 2, 2015

(54) LIQUID CRYSTAL DISPLAY

(75) Inventors: Hoon Kim, Ansan-si (KR); Kaeun Kim, Seoul (KR); Su Jeong Kim, Seoul (KR); Kichul Shin, Asan-si (KR); Hokil Oh, Asan-si (KR); Jae-Hoon Jung, Incheon (KR); Minju Han, Seoul (KR)

(73) Assignee: Samsung Display Co., Ltd., Yongin (KR)

( * ) Notice: Subject to any disclaimer, the term of this patent is extended or adjusted under 35 U.S.C. 154(b) by 281 days.

(21) Appl. No.: 13/484,118

(22) Filed: May 30, 2012

(65) Prior Publication Data

US 2013/0128168 A1 May 23, 2013

(30) Foreign Application Priority Data

Nov. 21, 2011 (KR) .................. 10-2011-0121700

(51) Int. Cl.
*G02F 1/1343* (2006.01)
*G02F 1/1337* (2006.01)
*G02F 1/139* (2006.01)
*G02F 1/137* (2006.01)

(52) U.S. Cl.
CPC .... *G02F 1/133707* (2013.01); *G02F 1/134309* (2013.01); *G02F 1/1393* (2013.01); *G02F 2001/133742* (2013.01); *G02F 2001/134345* (2013.01); *G02F 2001/13712* (2013.01)

(58) Field of Classification Search
CPC ............... G02F 2001/134345; G02F 1/133707
USPC .................................................. 349/141, 144
See application file for complete search history.

(56) References Cited

U.S. PATENT DOCUMENTS

| 7,450,207 | B2 | 11/2008 | Shimoshikiryo |
| 2008/0316413 | A1* | 12/2008 | Cho ............................. 349/144 |
| 2009/0073367 | A1 | 3/2009 | Woo et al. |
| 2010/0177271 | A1* | 7/2010 | Cho et al. ...................... 349/144 |

FOREIGN PATENT DOCUMENTS

| JP | 2007-256906 | 10/2007 |
| JP | 2008-015229 | 1/2008 |

* cited by examiner

*Primary Examiner* — Lucy Chien
(74) *Attorney, Agent, or Firm* — H.C. Park & Associates, PLC

(57) ABSTRACT

A liquid crystal display including a first substrate, a second substrate, and liquid crystal molecules disposed between the first substrate and the second substrate. The first substrate includes a first base substrate and a common electrode disposed on the first base substrate. The second substrate includes a second base substrate facing the first base substrate and a first pixel electrode disposed on the second base substrate. The first pixel electrode includes a first area and a second area which form different electric fields in cooperation with the common electrode. Accordingly, the liquid crystal display enhances an aperture ratio and increases a side viewing angle.

19 Claims, 10 Drawing Sheets

LIQUID CRYSTAL DISPLAY

CROSS-REFERENCE TO RELATED APPLICATION

This application claims priority from and the benefit of Korean Patent Application No. 10-2011-0121700, filed on Nov. 21, 2011, which is hereby incorporated by reference for all purposes as if fully set forth herein.

BACKGROUND

1. Field

Exemplary embodiments of the present invention relate to a liquid crystal display having improved display quality.

2. Discussion of the Background

In general, a liquid crystal display includes two transparent substrates and a liquid crystal layer disposed between the two substrates. The liquid crystal display drives the liquid crystal layer to control a light transmittance in each pixel, thereby displaying a desired image.

As an operation mode for the liquid crystal display, a vertical alignment mode is widely used. In the vertical alignment mode liquid crystal display, liquid crystal molecules of the liquid crystal layer have a negative (−) dielectric anisotropy and are vertically aligned. When an electric field is generated between the two substrates, the liquid crystal molecules are realigned to transmit light. In the vertical alignment mode liquid crystal display, at least one of a pixel electrode or a common electrode is patterned in order to align the liquid crystal molecules in different directions from each other. Accordingly, the vertical alignment mode liquid crystal display includes liquid crystal domains different from each other, so a viewing angle of the vertical alignment mode liquid crystal display is increased.

However, when thin film transistors or capacitors are formed in the pixel in order to form the liquid crystal domains in the vertical alignment mode liquid crystal display, an aperture ratio of the vertical alignment mode liquid crystal display is reduced.

SUMMARY OF THE INVENTION

Exemplary embodiments of the present invention provide a liquid crystal display capable of enhancing an aperture ratio and increasing a side viewing angle thereof.

Additional features of the invention will be set forth in the description which follows, and in part will be apparent from the description, or may be learned by practice of the invention An exemplary embodiment of the present invention discloses a liquid crystal display including a first substrate, a second substrate, and liquid crystal molecules disposed between the first substrate and the second substrate. The first substrate includes a first base substrate and a common electrode disposed on the first base substrate. The second substrate includes a second base substrate facing the first base substrate and a first pixel electrode disposed on the second base substrate. The first pixel electrode includes a first area and a second area to form different electric fields in cooperation with the common electrode.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
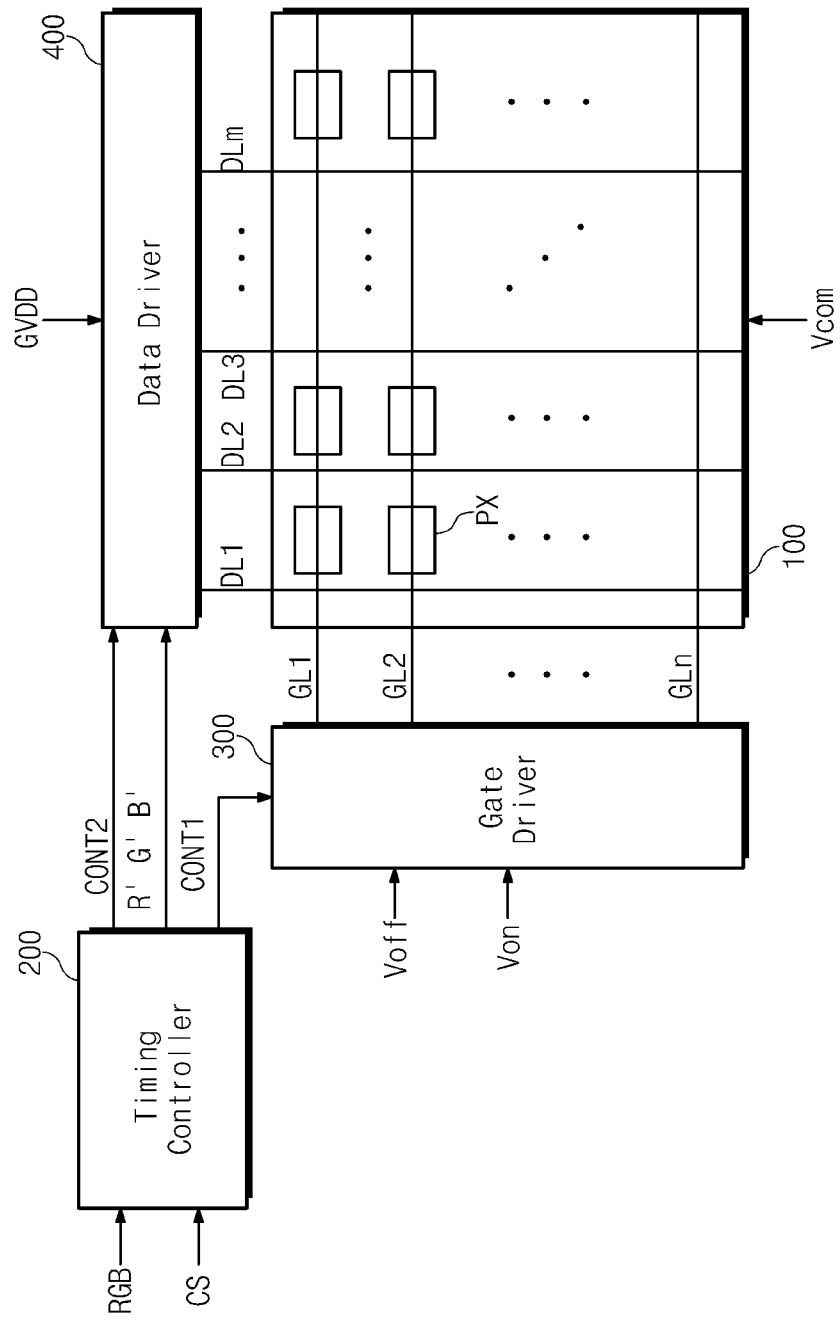
FIG. 1 is a block diagram showing a liquid crystal display according to a first exemplary embodiment of the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

It will be understood that when an element or layer is referred to as being "on", "connected to" or "coupled to" another element or layer, it can be directly on, connected or coupled to the other element or layer, or intervening elements or layers may be present. In contrast, when an element is referred to as being "directly on," "directly connected to" or "directly coupled to" another element or layer, there are no intervening elements or layers present. As used herein, the term "and/or" includes any and all combinations of one or more of the associated listed items. It will be understood that for the purposes of this disclosure, "at least one of X, Y, and Z" can be construed as X only, Y only, Z only, or any combination of two or more items X, Y, and Z (e.g., XYZ, XYY, YZ, ZZ).

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms, "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the present invention will be explained in detail with reference to the accompanying drawings.

Figure 2:
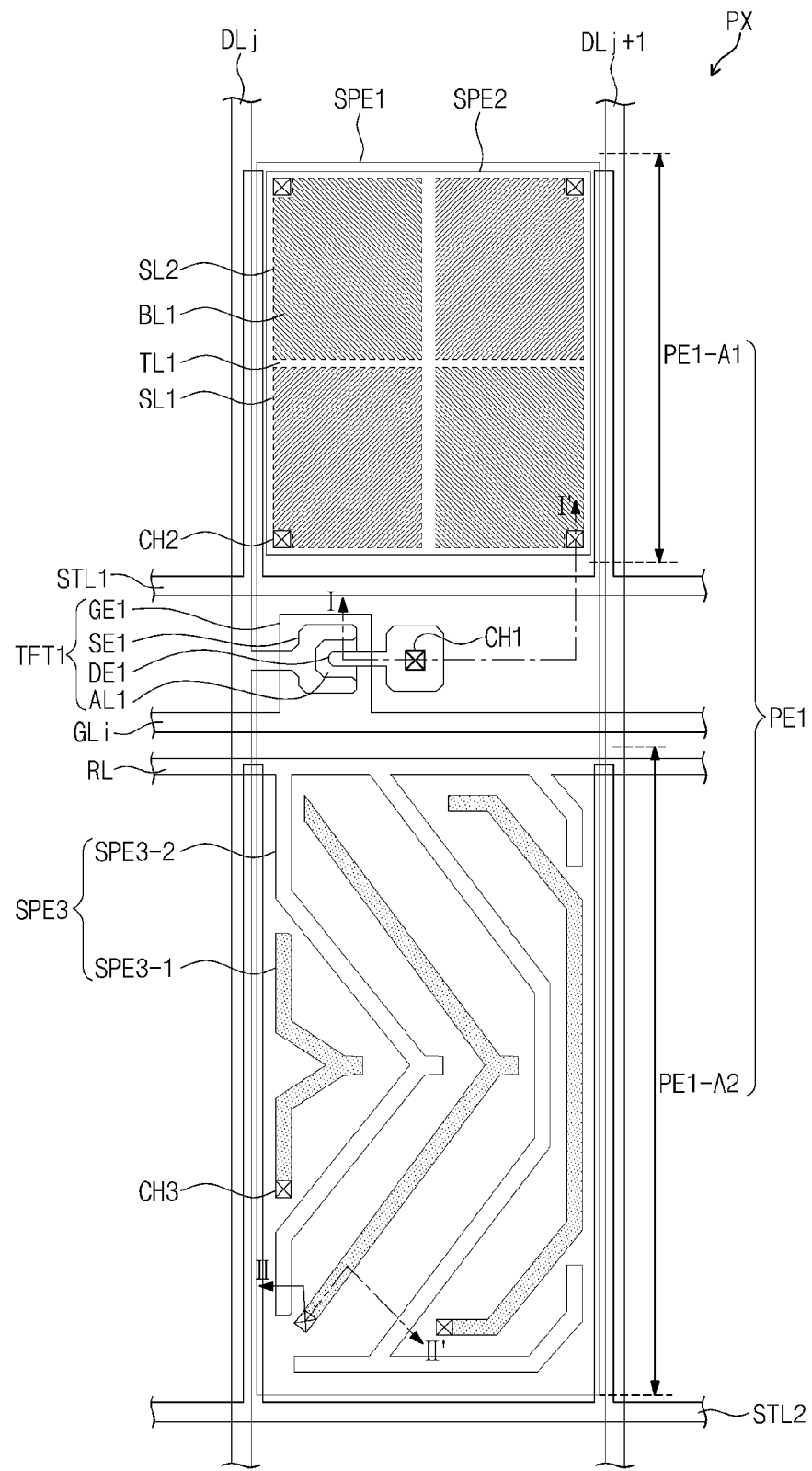
FIG. 2 is a plan view showing a pixel shown in FIG. 1.
Figure 3:
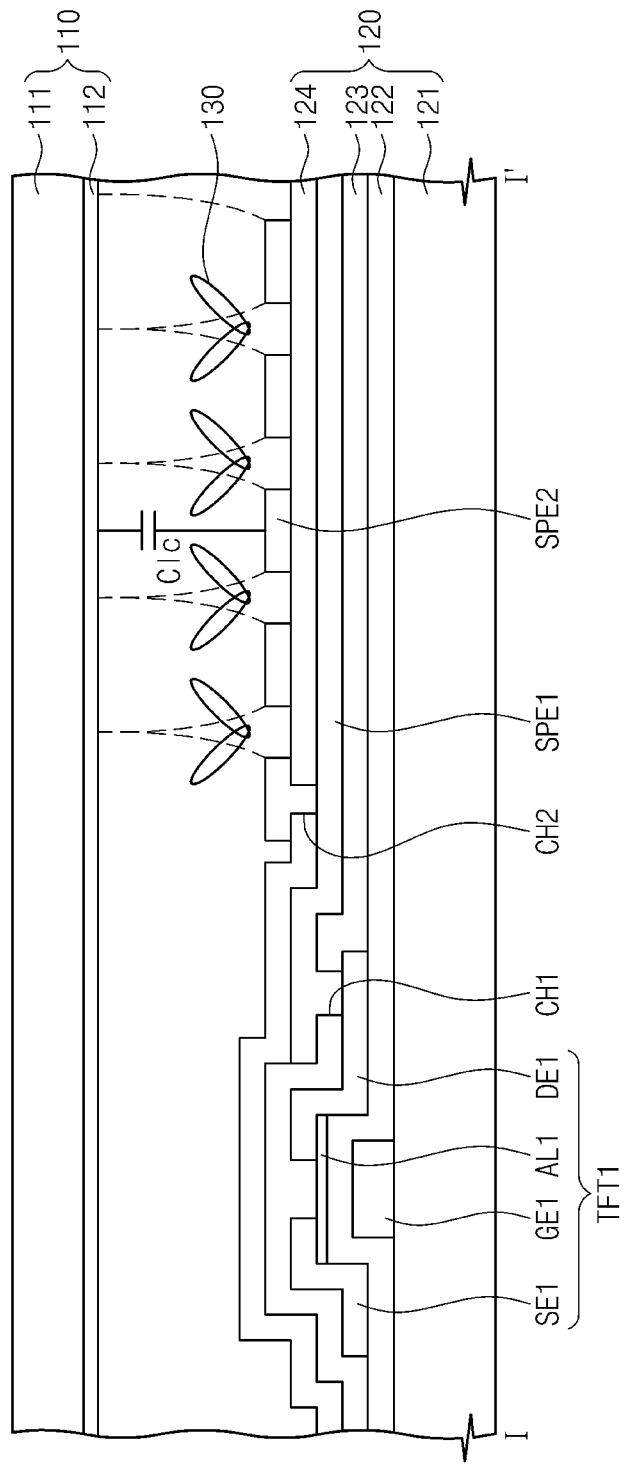
FIG. 3 is a cross-sectional view taken along line I-I' shown in FIG. 2.
Figure 4:
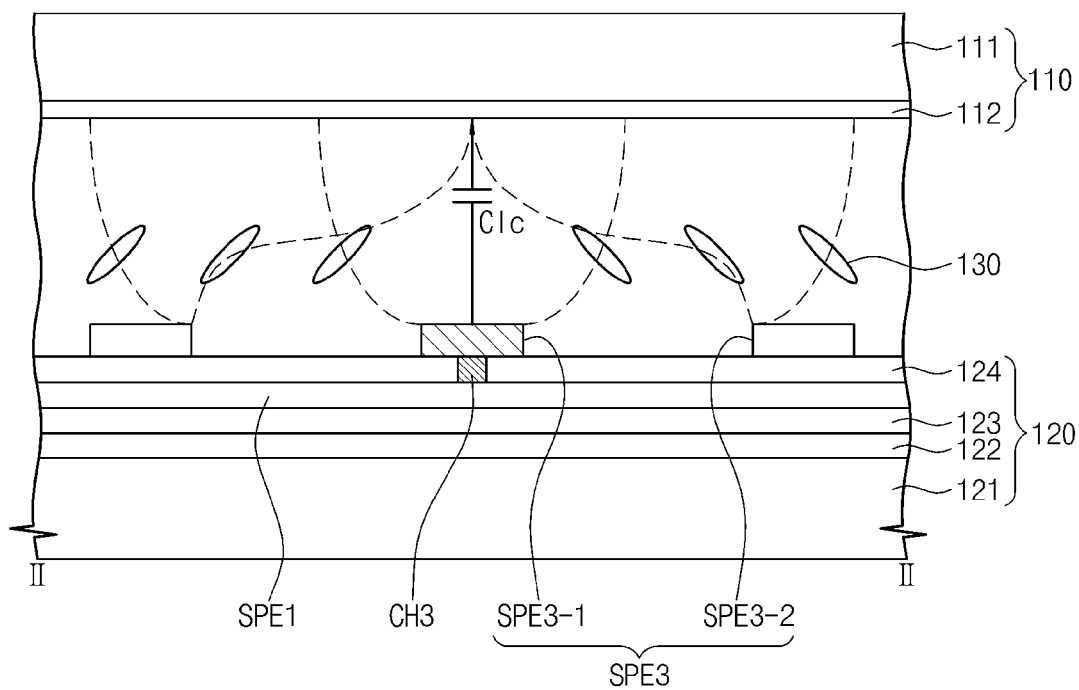
FIG. 4 is a cross-sectional view taken along line II-II' shown in FIG. 2.

FIG. 1 is a block diagram showing a liquid crystal display according to a first exemplary embodiment of the present invention, FIG. 2 is a plan view showing a pixel shown in FIG. 1, FIG. 3 is a cross-sectional view taken along line I-I' shown in FIG. 2, and FIG. 4 is a cross-sectional view taken along line II-II' shown in FIG. 2.

Referring to FIG. 1, a liquid crystal display includes a liquid crystal display panel 100, a timing controller 200, a gate driver 300, and a data driver 400.

The liquid crystal display panel 100 includes a first substrate 110, a second substrate 120 facing the first substrate 110, and liquid crystal molecules 130 disposed between the first substrate 110 and the second substrate 120.

The first substrate 110 includes a first base substrate 111 and a common electrode 112 disposed on the first base substrate 111.

The second substrate 120 includes a second base substrate 121 facing the first base substrate 111 and a first pixel electrode PE1 disposed on the second base substrate 121. The first pixel electrode PE1 includes a first area PE1-A1 and a second area PE1-A2 to form different electric fields from each other in cooperation with the common electrode 112.

A plurality of signal lines is disposed on the second base substrate 121. In addition, a plurality of pixels PX is disposed on the liquid crystal display panel 100 and connected to the signal lines.

The signal lines include a plurality of gate lines GL1 to GLn having gate signals applied thereto and a plurality of data lines DL1 to DLm having data voltages applied thereto. The gate lines GL1 to GLn are extended in a row direction and substantially parallel to each other. The data lines DL1 to DLm are extended in a column direction and substantially parallel to each other.

The liquid crystal molecules 130 have a negative (−) dielectric anisotropy and are vertically aligned with respect to the first base substrate 111 or the second base substrate 121.

In the present exemplary embodiment, the pixels PX all have the same structure and function, and thus one pixel PX will be described with reference to FIGS. 2 to 4 as a representative example.

As shown in FIGS. 2 to 4, each pixel PX includes a liquid crystal capacitor Clc and a first thin film transistor TFT1 for switching a voltage applied to the liquid crystal capacitor Clc. The liquid crystal capacitor Clc includes the first pixel electrode PE1 as a first electrode thereof and the common electrode 112 as a second electrode thereof. The liquid crystal molecules 130 serve as a dielectric layer of the liquid crystal capacitor Clc.

The first thin film transistor TFT1 includes a first gate electrode GE1, a first active layer AL1, a first source electrode SE1, and a first drain electrode DE1.

Referring to FIGS. 2 to 4, the first gate electrode GE1 is branched from one gate is line GLi (hereinafter, referred to as "first gate line") of the gate lines GL1 to GLn. That is, the first gate electrode GE1 is protruded from the first gate line GLi when viewed in a plan view.

A gate insulating layer 122 is disposed on the second base substrate 121 to cover the first gate line GLi and the first gate electrode GE1.

The first active layer AL1 is disposed on the first gate electrode GE1 while interposing the gate insulating layer 122 therebetween. The first active layer AL1 is overlapped with the first gate electrode GE1 when viewed in a plan view. The first active layer AL1 may include a metal oxide material serving as a semiconductor.

The data lines DL1 to DLm are disposed on the gate insulating layer 122. The first source electrode SE1 is branched from one data line DLj (hereinafter, referred to as "first data line") of the data lines DL1 to DLm. The first source electrode SE1 is partially overlapped with the first gate electrode GE1 and the first active layer AL1.

In addition, the first drain electrode DE1 is spaced apart from the first source electrode SE1. The first drain electrode DE1 is partially overlapped with the first gate electrode GE1 and the first active layer AL1.

A protective layer 123 is disposed on the second base substrate 121 to cover the first drain electrode DE1, the first source electrode SE1, and the first data line DL1.

The first pixel electrode PE1 is disposed on the protective layer 123 and is connected to the first drain electrode DE1. The first thin film transistor TFT1 receives the data voltage and outputs the data voltage to the first pixel electrode PE1 as a first pixel voltage.

When the first pixel voltage is applied to the first pixel electrode PE1, the first pixel electrode PE1 forms an electric field together with the common electrode 112. Accordingly, the alignment of the liquid crystal molecules 130 is changed so as to transmit the light incident to the liquid crystal molecules 130.

The first pixel electrode PE1 includes two areas PE1-A1 and PE1-A2. The electric field formed by the first area PE1-A1 and the common electrode 112 is different from the electric field formed by the second area PE1-A2 and the common electrode 112. Thus, the liquid crystal molecules 130 disposed corresponding to the first area PE1-A1 are aligned in a direction different from a direction in which the liquid crystal molecules 130 disposed corresponding to the second area PE1-A2 are aligned. The first area PE1-A1 and the second area PE1-A2 have different sizes. For example, the second area PE1-A2 may be larger than the first area PE1-A1.

The transmittance of the light passing through the first area PE1-A1 is different from the transmittance of the light passing through the second area PE1-A2. The light passing through the pixel PX travels in various directions according to the first and second areas PE1-A1 and PE1-A2 of the first pixel electrode PE1, and thus the viewing angle of the liquid crystal display may be increased.

Figure 5:
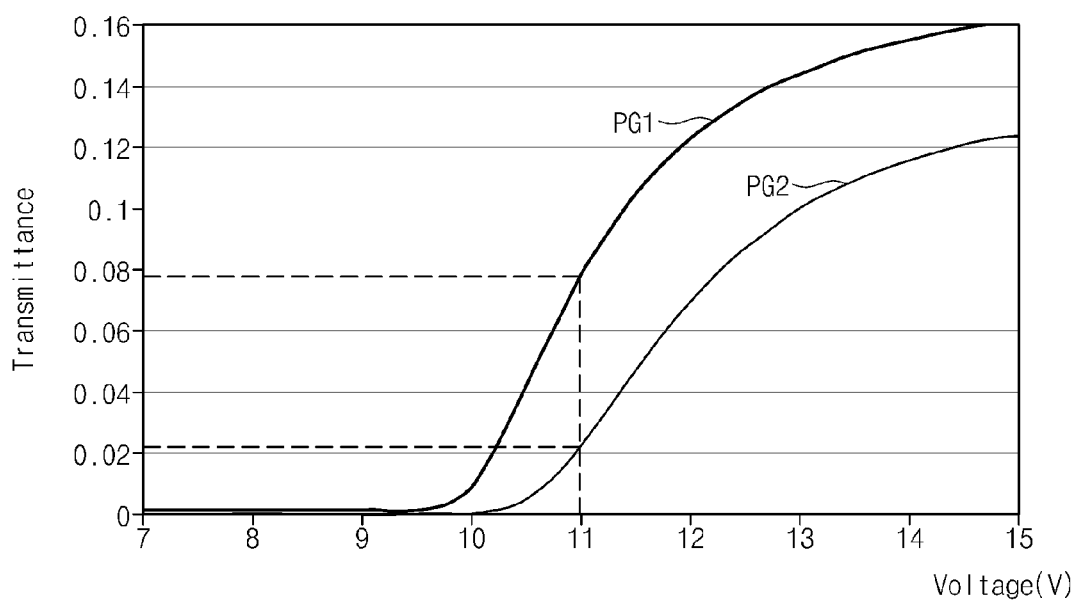
FIG. 5 is a graph showing a pixel voltage applied to the pixel shown in FIG. 1 as a function of a transmittance.

FIG. 5 is a graph showing a pixel voltage applied to the pixel shown in FIG. 1 as a function of a transmittance.

According to FIG. 5, a first graph PG1 represents a transmittance greater than a transmittance represented by a second graph PG2 with respect to the same pixel voltage. A y-axis of the first and second graphs PG1 and PG2 represents a relative value. The first graph PG1 represents the transmittance of the light passing through the first area PE1-A1 and the second graph PG2 represents the transmittance of the light passing through the second area PE1-A2.

The first and second graphs PG1 and PG2 are obtained under a condition in which a cell gap between the common electrode 112 and the first pixel electrode PE1 is about 3.2 micrometers. In addition, the first and second graphs PG1 and PG2 are obtained under conditions in which a birefringence (Δn) of the liquid crystal molecules 130 is about 0.1018, a dielectric anisotropy (Δ∈) is about −3.2, a rotation viscosity (γ1) is about 112, and a density is about 1.0036. In addition, the second graph PG2 is obtained under a condition in which a distance between a first electrode part SPE3-1 and a second electrode part SPE3-2 of a third sub-pixel electrode SPE3 (refer to FIGS. 2 to 4) is about 4 micrometers.

Hereinafter, the first pixel electrode PE1 will be described in detail with reference to FIGS. 2 to 4.

The first pixel electrode PE1 includes a first sub-pixel electrode SPE1, a second sub-pixel electrode SPE2, and a third sub-pixel electrode SPE3.

The first sub-pixel electrode SPE1 is disposed on the protective layer 123. The first sub-pixel electrode SPE1 is connected to the first drain electrode DE1 through a first contact hole CH1 formed through the protective layer 123. The first sub-pixel electrode SPE1 is disposed in the first area PE1-A1 and the second area PE1-A2.

An insulating layer 124 is disposed on the second base substrate 121 to cover the first sub-pixel electrode SPE1. The second sub-pixel electrode SPE2 is disposed on the insulating layer 124 to correspond to the first area PE1-A1. In addition, the third sub-pixel electrode SPE3 is disposed on the insulating layer 124 to correspond to the second area PE1-A2.

The second sub-pixel electrode SPE2 includes a plurality of first slits SL1 and second slits SL2. Each of the first slits SL1 and second slits SL2 exposes the insulating layer 124. The second sub-pixel electrode SPE2 includes a first trunk portion TL1 and a plurality of branch portions BL1 extended from the first trunk portion TL1 in a radial manner so as to divide the first area PE1-A1 into domains. As shown in FIG. 2, the first trunk portion TL1 may have a cross shape, and thus the first area PE1-A1 is divided into four sub-domains.

The first slits SL1 and second slits SL2 are disposed between two first branch portions BL1 adjacent to each other among the first branch portions BL1. The two adjacent first branch portions BL1 are spaced apart from each other on the order of a micrometer by the slits SL1 and SL2. The first slits SL1 are disposed in a first sub-domain and a third sub-domain of the four domains, and the second slits SL2 are disposed in a second sub-domain and a fourth sub-domain of the four domains.

The first slits SL1 are extended in a first direction and the second slits SL2 are extended in a second direction crossing the first direction. The liquid crystal molecules 130 disposed in the first area PE1-A1 are pre-tilted in different directions from each other in the domains by the first and second slits SL1 and SL2. Consequently, a response speed of the liquid crystal molecules 130 becomes high.

The second sub-pixel electrode SPE2 is connected to the first sub-pixel electrode SPE1 through a second contact hole CH2 formed through the insulating layer 124. In FIG. 2, four second contact holes CH2 have been shown. As described above, since the second sub-pixel electrode SPE2 is connected to the first sub-pixel electrode SPE1, the second sub-pixel electrode SPE2 receives the same voltage as the first sub-pixel electrode SPE1.

The third sub-pixel electrode SPE3 includes the first electrode part SPE3-1 and the second electrode part SPE3-2. The first electrode part SPE3-1 and the second electrode part SPE3-2 are separated from each other.

The first electrode part SPE3-1 is connected to the first sub-pixel electrode SPE1 through a third contact hole CH3 formed through the insulating layer 124. Accordingly, the first electrode part SPE3-1 receives the same voltage as the first sub-pixel electrode SPE1. Three third contact holes CH3 have been shown in FIG. 2.

The second electrode part SPE3-2 receives a voltage different from a voltage applied to the first sub-pixel electrode SPE1. The second electrode part SPE3-2 is connected to a reference voltage line RL. The reference voltage line RL may connect the second electrode parts SPE3-2 to each other of the third sub-pixel electrodes of the pixels arranged adjacent to each other in the same pixel row. In addition, the voltage applied to the reference voltage line RL may have the same level as the common voltage Vcom applied to the common electrode 112.

The first electrode part SPE3-1 and the second electrode part SPE3-2 are alternately arranged with each other in the second area PE1-A2 so as to have a branch shape. In detail, one branch portion of the first electrode part SPE3-1 is disposed between two branch portions of the second electrode part SPE3-2, which are adjacent to each other, and one branch portion of the second electrode part SPE3-2 is disposed between two branch portions of the first electrode part SPE3-1, which are adjacent to each other. In the present exemplary embodiment, each of the first electrode part SPE3-1 and the second electrode part SPE3-2 has a width equal to or less than a distance between the first electrode part SPE3-1 and the second electrode part SPE3-2. As the distance between the first electrode part SPE3-1 and the second electrode part SPE3-2 decreases, the rate of transmittance increase shown in the second graph PG2 becomes greater.

When the first pixel voltage is applied to the first sub-pixel electrode SPE1, a first fringe field is generated between the common electrode 112 and the second sub-pixel electrode SPE2. In addition, when the first pixel voltage is applied to the first sub-pixel electrode SPE1, a second fringe field different from the first fringe field is generated between the common electrode 112 and the first electrode part SPE3-1, and a lateral field is generated between the first electrode part SPE3-1 and the second electrode part SPE3-2.

As described above, electric fields different from each other are formed in the first area PE1-A1 and the second area PE1-A2, respectively. Accordingly, the alignment of the liquid crystal molecules 130 in the first area PE1-A1 is different from the alignment of the liquid crystal molecules 130 in the second area PE1-A2. Thus, the side viewing angle of the liquid crystal display may be increased.

Meanwhile, a first storage line STL1 and a second storage line STL2 may be further disposed on the second base substrate 121. The first and second storage lines STL1 and STL2 are disposed on the same layer as the first gate line GLi is disposed. Each of the first and second storage lines STL1 and STL2 forms a storage capacitor together with the first pixel electrode PE1.

Referring to FIG. 1 again, the timing controller 200 receives a plurality of image signals RGB and a plurality of control signals CS from an external device (not shown). The timing controller 200 converts a data format of the image signals RGB into a data format appropriate to an interface between the data driver 400 and the timing controller 200 and provides the converted image signals R'G'B' to the data driver 400. In addition, the timing controller 200 applies data control signals CONT2, such as an output start signal, a horizontal start signal, etc., to the data driver 400 and gate signals CONT1, such as a vertical start signal, a clock signal, a clock bar signal, etc., to the gate driver 300.

The gate driver 300 generates a gate signal including a gate-on voltage Von and a gate-off voltage Voff in response to the gate control signals CONT1 provided from the timing controller 200. The gate signal is sequentially applied to the gate lines GL1 to GLn of the liquid crystal display panel 100.

The data driver 400 is operated in response to the data control signals CONT2 provided from the timing controller 200. The data driver 400 converts the image signals R'G'B' into the data voltages based on a reference gray scale voltage GVDD from the outside. The data voltages are applied to the data lines DL1 to DLm of the liquid crystal display panel 100. Meanwhile, the reference gray scale voltage GVDD may have a positive (+) value or a negative (−) value with respect to the common voltage Vcom.

Figure 6:
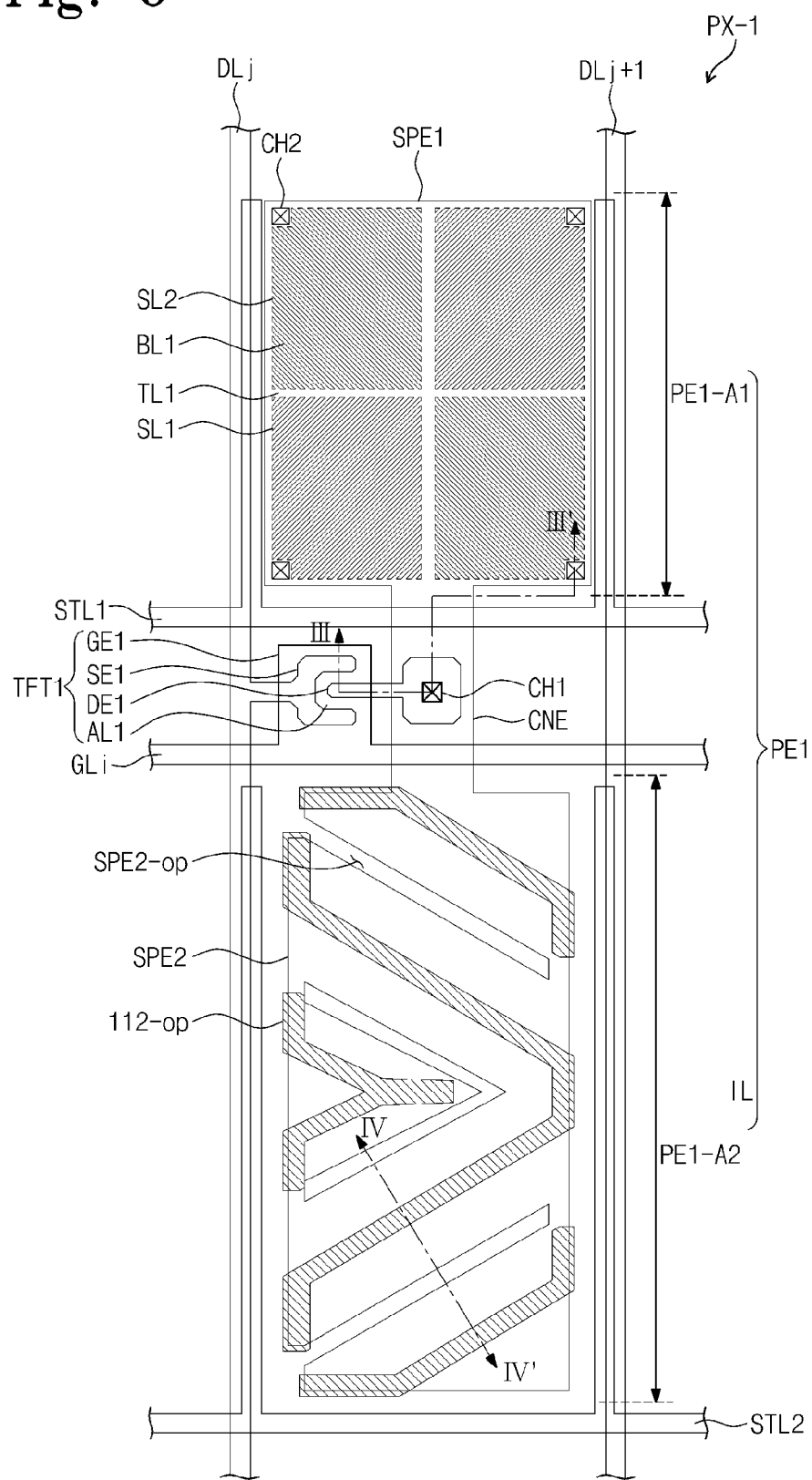
FIG. 6 is a plan view showing a pixel of a liquid crystal display according to a second exemplary embodiment of the present invention.
Figure 7:
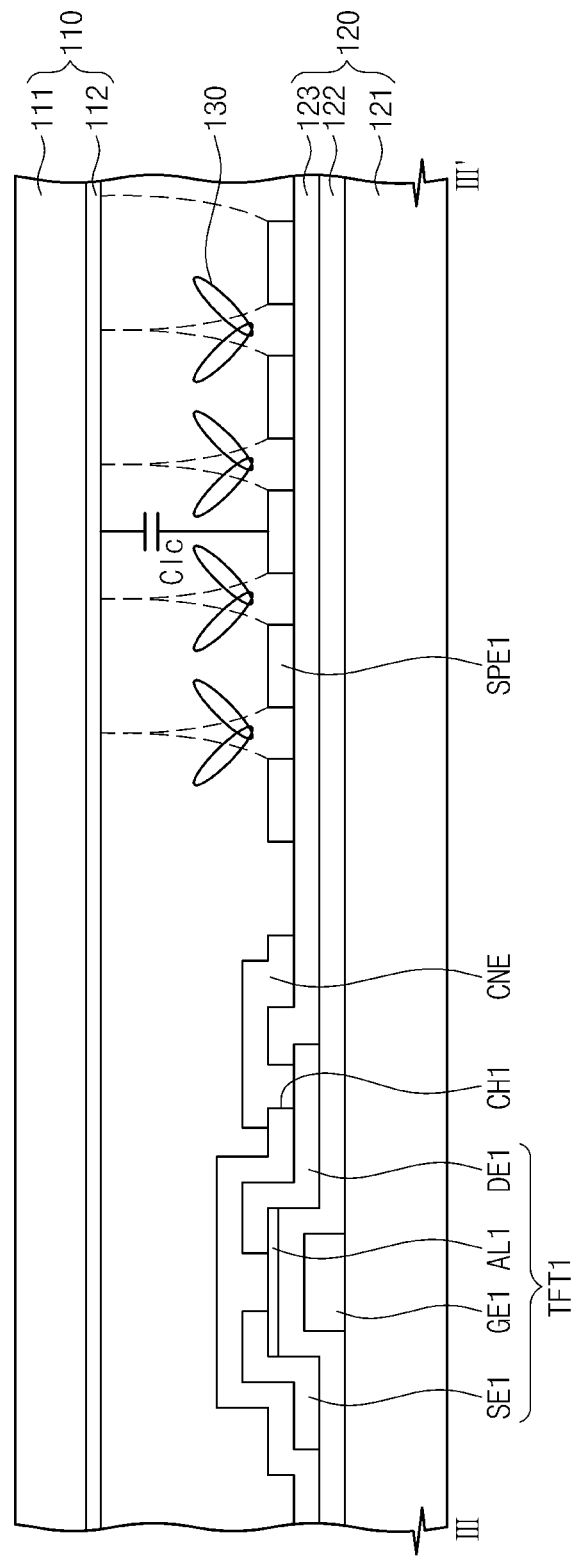
FIG. 7 is a cross-sectional view taken along line III-III' shown in FIG. 6.
Figure 8:
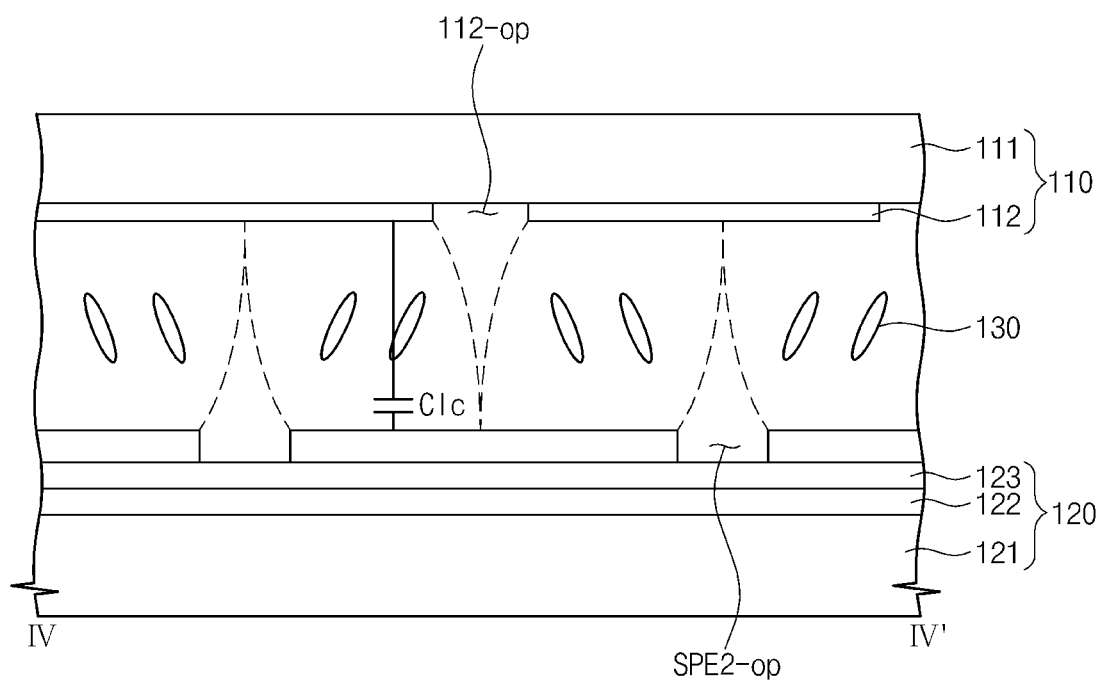
FIG. 8 is a cross-sectional view taken along line IV-IV' shown in FIG. 6.

FIG. 6 is a plan view showing a pixel of a liquid crystal display according to a second exemplary embodiment of the present invention, FIG. 7 is a cross-sectional view taken along a line III-III' shown in FIG. 6, and FIG. 8 is a cross-sectional view taken along a line IV-IV' shown in FIG. 6. In FIGS. 6 to 8, the same reference numerals denote the same elements in FIGS. 1 to 5, and thus detailed descriptions of the same elements will be omitted.

Referring to FIGS. 6 to 8, a liquid crystal display includes a liquid crystal display panel 100, a timing controller 200, a gate driver 300, and a data driver 400.

The liquid crystal display panel 100 includes a first substrate 110, a second substrate 120 facing the first substrate 110, and liquid crystal molecules 130 disposed between the first substrate 110 and the second substrate 120.

The liquid crystal display panel 100 includes a plurality of pixels PX-1, each of which is connected to a corresponding gate line of the gate lines GL1 to GLn and a corresponding data line of the data lines DL1 to DLm. Each of the pixels PX-1 includes a liquid crystal capacitor Clc and a first thin film transistor TFT1 for switching a voltage applied to the liquid crystal capacitor Clc. The liquid crystal capacitor Clc includes the first pixel electrode PE1 as a first electrode thereof and the common electrode 112 as a second electrode thereof. The liquid crystal molecules 130 serve as a dielectric layer of the liquid crystal capacitor Clc.

The first pixel electrode PE1 is disposed on the second base substrate 121. The first pixel electrode PE1 includes a first area PE1-A1 and a second area PE1-A2 to form different electric fields from each other in cooperation with the common electrode 112.

As described with reference to FIG. 5, the transmittance of the first area PE1-A1 is greater than the transmittance of the second area PE1-A2 at the same voltage level. However, the transmittance of the first area PE1-A1 of the pixel PX-1 shown in FIG. 6 according to the voltage level may not match with that represented by the first graph PG1 shown in FIG. 5.

In addition, the transmittance of the second area PE1-A2 of the pixel PX-1 shown in FIG. 6 according to the voltage level may not match with that represented by the second graph PG2 shown in FIG. 5.

The first pixel electrode PE1 includes a first sub-pixel electrode SPE1 and a second sub-pixel electrode SPE2, which are disposed on the protective layer 123. The first pixel electrode PE1 has a structure similar to that of the first pixel electrode PE1 of the liquid crystal display described with reference to FIGS. 1 to 5 except that the first sub-pixel electrode SPE1 is omitted from the first pixel electrode PE1 of the liquid crystal display described with reference to FIGS. 1 to 5.

As shown in FIGS. 6 to 8, the first sub-pixel electrode SPE1 is disposed on the protective layer 123 to correspond to the first area PE1-A1 and the second sub-pixel electrode SPE2 is disposed on the protective layer 123 to correspond to the second area PE1-A2.

The first sub-pixel electrode SPE1 shown in FIG. 6 has the same structure as the second sub-pixel electrode SPE2 shown in FIG. 2. The first sub-pixel electrode SPE1 includes a plurality of slits SL1 and SL2 and is divided into a plurality of sub-domains. The first sub-pixel electrode SPE1 includes a first trunk portion TL1 in a cross shape and a plurality of branch portions BL1 extended from the first trunk portion TL1 in a radial manner.

The second sub-pixel electrode SPE2 includes at least one first opening SPE2-op for dividing the second area PE1-A2 into plural domains. The first opening SEP2-op exposes the protective layer 123 therethrough. The second sub-pixel electrode SPE2 is disposed on the same layer as the first sub-pixel electrode SPE1 and connected to the first sub-pixel electrode SPE1.

As shown in FIG. 6, the second sub-pixel electrode SPE2 may be connected to the first sub-pixel electrode SPE1 through a connection electrode CNE. The connection electrode CNE is connected to the first drain electrode DE1 of the first thin film transistor TFT1 through a first contact hole CH1 formed through the protective layer 123. Thus, the first sub-pixel electrode SPE1 and the second sub-pixel electrode SPE2 receive the first pixel voltage.

The second sub-pixel electrode SPE2 may include three first openings SEP2-op. In addition, each of the first openings SEP2-op may be symmetrical with each other with reference to an imaginary line IL that divides the second sub-pixel electrode SPE2.

In this case, the common electrode 112 includes at least one second opening 112-op corresponding to the second area PE1-A2. Each of the second openings 112-op may be symmetrical with each other with reference to the imaginary line IL.

As a result of the first openings SPE2-op and the second openings 112-op, a deformed electric field is formed between the pixel electrode PE1 and the common electrode 112. The liquid crystal molecules 130 are aligned differently with reference to the first openings SPE2-op and the second openings 112-op and are included in different sub-domains.

Meanwhile, the sub-pixel electrodes of the first area PE1-A1 shown in FIGS. 2 to 4 may be disposed in the first area PE1-A1 of the pixel PX-1 shown in FIG. 6, and the sub-pixel electrodes of the second area PE1-A2 shown in FIGS. 2 to 4 may be disposed in the second area PE1-A2 of the pixel PX-1 shown in FIG. 6.

Figure 9:
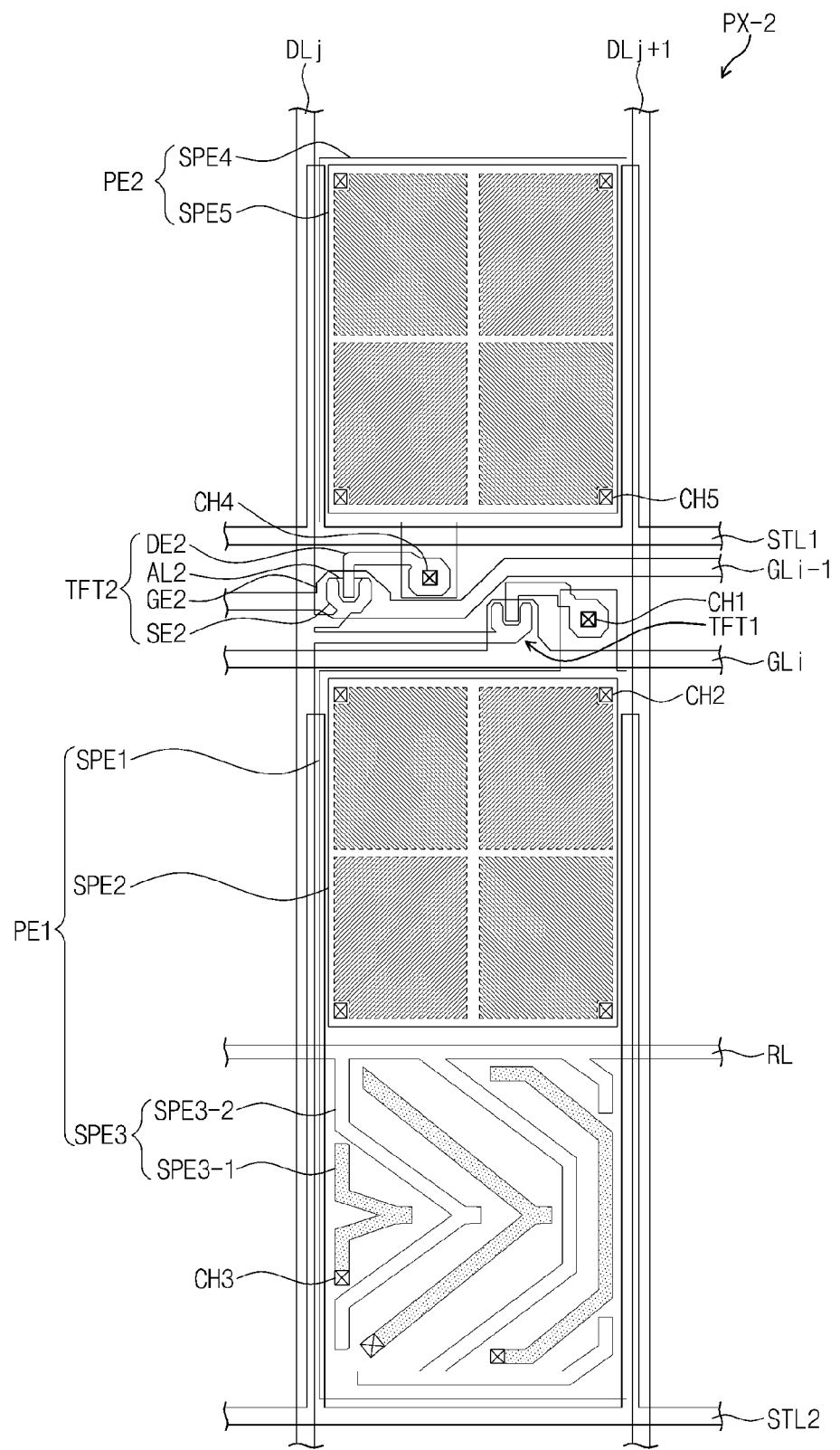
FIG. 9 is a plan view showing a pixel of a liquid crystal display according to a third exemplary embodiment of the present invention.

FIG. 9 is a plan view showing a pixel of a liquid crystal display according to a third exemplary embodiment of the present invention. In FIG. 9, the same reference numerals denote the same elements in FIGS. 1 to 8, and thus detailed descriptions of the same elements will be omitted.

Referring to FIG. 9, the liquid crystal display panel 100 includes a plurality of pixels PX-2. Each of the pixels PX-2 includes a first liquid crystal capacitor, a second liquid crystal capacitor, a first thin film transistor TFT1 configured to switch a voltage applied to the first liquid crystal capacitor, and a second thin film transistor TFT2 configured to switch a voltage applied to the second liquid crystal capacitor.

The first liquid crystal capacitor includes the first pixel electrode PE1 as a first electrode thereof and the common electrode 112 (refer to FIGS. 2 and 3) as a second electrode thereof. The liquid crystal molecules 130 serve as a dielectric layer of the first liquid crystal capacitor.

In addition, the second liquid crystal capacitor includes a second pixel electrode PE2 as a first electrode thereof and the common electrode 112 (refer to FIGS. 2 and 3) as a second electrode thereof. The liquid crystal molecules 130 serve as a dielectric layer of the second liquid crystal capacitor.

That is, the pixel PX-2 shown in FIG. 9 further includes the second pixel electrode PE2 and the second thin film transistor TFT2 when compared with the pixel PX shown in FIGS. 2 to 4. Meanwhile, the first pixel electrode PE1 of the pixel PX-2 shown in FIG. 9 may be replaced with the first pixel electrode PE1 shown in FIGS. 6 to 8.

A second gate line GLi-1 is disposed on the second base substrate 121 to be extended in the same direction in which the first gate line GLi is extended. Among the gate lines GL1 to GLn, the first and second gate lines GLi and GLi-1 are successively arranged.

The second thin film transistor TFT2 includes a second gate electrode GE2, a second active layer AL2, a second source electrode SE2, and a second drain electrode DE2.

The second gate electrode GE2 is provided from the second gate line GLi-1 when viewed in a plan view in FIG. 9. The second active layer AL2 is disposed on the second gate electrode GE2 while interposing the gate insulating layer 122 therebetween. The second active layer AL2 is overlapped with the second gate electrode GE2. The second source electrode SE2 is branched from the first data line DLj, from which the first source electrode SE1 is branched. The second source electrode SE2 is partially overlapped with the second gate electrode GE2 and the second active layer AL2. In addition, the second drain electrode DE2 is spaced apart from the second source electrode SE2. The second drain electrode DE2 is partially overlapped with the second gate electrode GE2 and the second active layer AL2 as the second source electrode SE2.

The protective layer 123 covers the second drain electrode DE2, the second source electrode SE2, and the second data line DL2.

The second pixel electrode PE2 connected to the second drain electrode DE2 is disposed on the protective layer 123. The second thin film transistor TFT2 receives the data voltage and applies the data voltage to the second pixel electrode PE2 as a second pixel voltage. The second pixel voltage may have a level different from that of the first pixel voltage.

When viewed in a plan view, the first and second gate lines GLi and GLi-1 are disposed between the first pixel electrode PE1 and the second pixel electrode PE2. In addition, the areas of the first pixel electrode PE1 and the second pixel electrode PE2 may differ from each other. For instance, the first pixel electrode PE1 may have a greater area than that of the is second pixel electrode PE2, as shown in FIG. 9.

The second pixel electrode PE2 has the same structure as the first area PE1-A1 of the first pixel electrode PE1 shown in FIGS. 2 and 3. In other words, the second pixel electrode PE2 includes a fourth sub-pixel electrode SPE4 disposed on the protective layer 123 and a fifth sub-pixel electrode SPE5 facing the fourth sub-pixel electrode SPE4 while interposing the insulating layer 124 therebetween.

The fourth sub-pixel electrode SPE4 is connected to the second drain electrode DE2 through a fourth contact hole CH4 formed through the protective layer 123. In addition, the fifth sub-pixel electrode SPE5 is connected to the fourth sub-pixel electrode SPE4 through a fifth contact hole CH5 formed through the insulating layer 124.

The fifth sub-pixel electrode SPE5 includes a plurality of first slits SL1 and second slits SL2 and is divided into a plurality of sub-domains, similar to the second sub-pixel electrode SPE2 shown in FIG. 2.

Because the pixel shown in FIG. 9 further includes one thin film transistor and one pixel electrode when compared with the pixels shown in FIGS. 1 to 8, the number of the domains of the pixels shown in FIG. 9 may be increased. Thus, the liquid crystal display shown in FIG. 9 may have improved aperture ratio and an increased side viewing angle.

Figure 10:
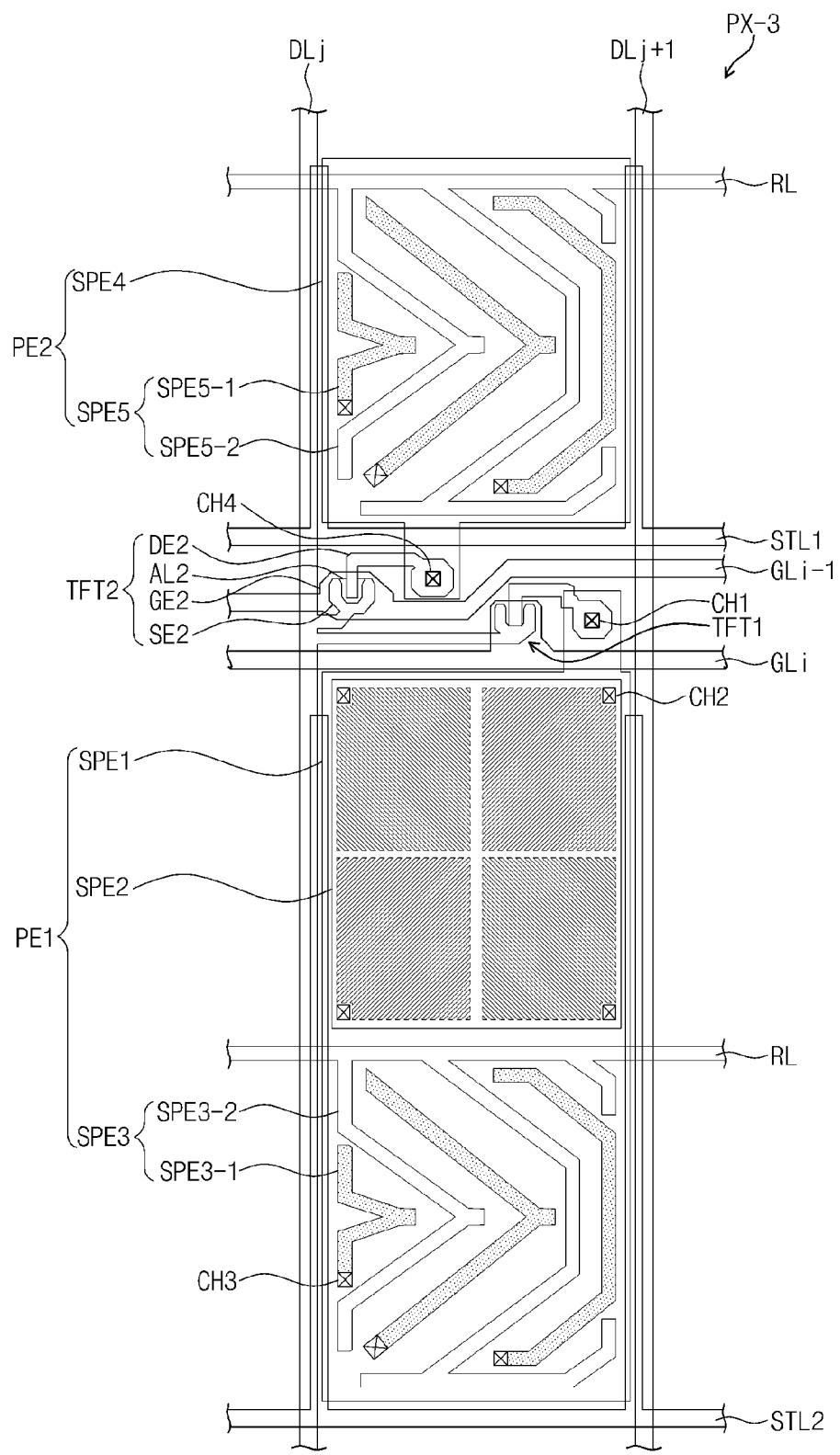
FIG. 10 is a plan view showing a pixel of a liquid crystal display according to a fourth exemplary embodiment of the present invention.

FIG. 10 is a plan view showing a pixel of a liquid crystal display according to a fourth exemplary embodiment of the present invention.

Referring to FIG. 10, a liquid crystal display includes a liquid crystal display panel 100 on which a plurality of pixels PX-3 is disposed. In each pixel PX-3 shown in FIG. 10, a second pixel electrode PE2 has a structure different from that of the pixel PX-2 shown in FIG. 9.

The second pixel electrode PE2 may have the same structure as the second area PE1-A2 of the first pixel electrode PE1 shown in FIGS. 2 and 4. That is, the second pixel electrode PE2 includes a fourth sub-pixel electrode SPE4 disposed on the protective layer 123 and a fifth sub-pixel electrode SPE5 facing the fourth sub-pixel electrode SPE4 while interposing the insulating layer 124 therebetween.

The fourth sub-pixel electrode SPE4 is connected to the second drain electrode DE2 through a fourth contact hole CH4 formed through the protective layer 123.

The fifth sub-pixel electrode SPE5 includes a first electrode part SPE5-1 and a second electrode part SPE5-2. The first electrode part SPE5-1 and the second electrode part SPE5-2 are separated from each other.

The first electrode part SPE5-1 is connected to the first sub-pixel electrode SPE1 through a fifth contact hole CH5 formed through the insulating layer 124. Thus, the second pixel voltage is applied to the first electrode part SPE5-1. A voltage different from the voltage applied to the first sub-pixel electrode SPE1 is applied to the second electrode part SPE5-2.

The first electrode part SPE5-1 is alternately arranged with the second electrode part SPE5-2 in a branch shape. The arrangement of the first electrode part SPE5-1 and the second electrode part SPE5-2 is the same as the first electrode part SPE3-1 and the second electrode part SPE3-2 described with reference to FIGS. 2 and 4.

According to the above, the liquid crystal display includes two different domains from each other, thereby increasing a side viewing angle of the liquid crystal display. In addition, the liquid crystal display drives the two domains using one thin film transistor to thereby enhance the aperture ratio.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A liquid crystal display comprising:
a first substrate comprising a common electrode disposed on the first substrate;
a second substrate facing the first substrate and a first pixel electrode disposed on the second substrate, the first pixel electrode comprising a first area and a second area configured to form different electric fields from each other in cooperation with the common electrode; and
liquid crystal molecules disposed between the first substrate and the second substrate,
wherein the first area and the second area have different sizes when viewed in a plan view, and the first and second areas receive a first pixel voltage; and
the first pixel electrode comprises:
a first sub-pixel electrode disposed in the first area and comprising a plurality of slits; and
a second sub-pixel electrode disposed in the second area and comprising at least one first opening.

2. The liquid crystal display of claim 1, further comprising:
a first gate line disposed on the second substrate;
a data line insulated from the first gate line and crossing the first gate line; and
a first thin film transistor connected to the first gate line, the data line, and the first pixel electrode and configured to output the first pixel voltage.

3. The liquid crystal display of claim 2, wherein the liquid crystal molecules transmit a light incident thereto when the first pixel voltage is applied to the first pixel electrode, and the liquid crystal molecules disposed corresponding to the first area have a greater transmittance of the light than a transmittance of the liquid crystal molecules disposed corresponding to the second area.

4. The liquid crystal display of claim 3, wherein the second area is greater than the first area.

5. The liquid crystal display of claim 3, wherein the liquid crystal molecules are vertically aligned between the first substrate and the second substrate.

6. A liquid crystal display comprising:
a first substrate comprising a common electrode disposed on the first substrate;
a second substrate facing the first substrate and a first pixel electrode disposed on the second substrate, the first pixel electrode comprising a first area and a second area configured to form different electric fields from each other in cooperation with the common electrode; and
liquid crystal molecules disposed between the first substrate and the second substrate,
wherein:
the first area and the second area have different sizes when viewed in a plan view, and the first and second areas receive a first pixel voltage; and
the first pixel electrode comprises:
a first sub-pixel electrode disposed in the first area and the second area;
a second sub-pixel electrode disposed in the first area facing the first sub-pixel electrode, an insulating layer disposed between the first sub-pixel electrode and the second sub-pixel electrode, and the second sub-pixel electrode comprising a plurality of slits; and
a third sub-pixel electrode disposed in the second area facing the first sub-pixel electrode, the insulating layer disposed between the first sub-pixel electrode and the third sub-pixel electrode, and the third sub-pixel electrode comprising a first electrode part and a second electrode part which receive different voltages from each other.

7. The liquid crystal display of claim 6, further comprising a plurality of the first electrode parts and a plurality of the second electrode parts, and the first electrode parts are alternately arranged with the second electrode parts.

8. The liquid crystal display of claim 7, wherein the first electrode parts are connected to the first sub-pixel electrode.

9. The liquid crystal display of claim 7, wherein the second sub-pixel electrode is connected to the first sub-pixel electrode.

10. The liquid crystal display of claim 9, wherein a portion of the slits is extended in a first direction and a remaining portion of the slits is extended in a second direction.

11. The liquid crystal display of claim 1, wherein the common electrode comprises at least one second opening corresponding to the second area of the first pixel electrode.

12. The liquid crystal display of claim 1, further comprising a plurality of the first openings and each of the first openings is symmetrical with reference to an imaginary line crossing the second sub-pixel electrode.

13. The liquid crystal display of claim 2, further comprising a second pixel electrode disposed on the second substrate.

14. The liquid crystal display of claim 13, further comprising:
a second gate line disposed on the second substrate; and
a second thin film transistor connected to the second gate line, the data line, and the second pixel electrode and configured to apply a second pixel voltage to the second pixel electrode.

15. The liquid crystal display of claim 13, wherein an area of the first pixel electrode is greater than an area of the second pixel electrode.

16. The liquid crystal display of claim 13, wherein the second pixel electrode comprises:
a first sub-pixel electrode disposed on the first substrate; and
a second sub-pixel electrode disposed facing the first sub-pixel electrode, an insulating layer disposed there between, and the second sub-pixel electrode comprising a plurality of slits.

17. The liquid crystal display of claim 16, wherein the second sub-pixel electrode is connected to the first sub-pixel electrode.

18. A liquid crystal display comprising:
a first substrate comprising a common electrode disposed on the first substrate;
a second substrate facing the first substrate and a first pixel electrode disposed on the second substrate, the first pixel electrode comprising a first area and a second area configured to form different electric fields from each other in cooperation with the common electrode;
liquid crystal molecules disposed between the first substrate and the second substrate;
a first gate line disposed on the second substrate;
a data line insulated from the first gate line and crossing the first gate line;
a first thin film transistor connected to the first gate line, the data line, and the first pixel electrode and configured to output the first pixel voltage; and
a second pixel electrode disposed on the second substrate,
wherein:
the first area and the second area have different sizes when viewed in a plan view, and the first and second areas receive a first pixel voltage; and
the second pixel electrode comprises:
a first sub-pixel electrode disposed on the first substrate; and a second sub-pixel electrode disposed facing the first sub-pixel electrode, the insulating layer disposed there between, and the second sub-pixel comprising a first electrode part and a second electrode part receiving voltages which differ from each other.

19. The liquid crystal display of claim 18, wherein the first electrode part is connected to the first sub-pixel electrode.

* * * * *